United States Patent
Scarpetti

[19]

[11] Patent Number: 6,013,123
[45] Date of Patent: Jan. 11, 2000

[54] INKING METHODS AND COMPOSITIONS FOR PRODUCTION OF DIGITIZED STEREOSCOPIC POLARIZING IMAGES

[75] Inventor: Julius J. Scarpetti, Revere, Mass.

[73] Assignee: The Rowland Institute for Science, Cambridge, Mass.

[21] Appl. No.: 08/903,889

[22] Filed: Jul. 31, 1997

Related U.S. Application Data

[63] Continuation-in-part of application No. 08/381,131, Jan. 31, 1995.

[51] Int. Cl.[7] ............................ C09D 11/12; G01D 11/00
[52] U.S. Cl. .................................. 106/31.27; 106/31.32; 106/31.13; 347/100
[58] Field of Search ............................. 106/31.05, 31.27, 106/31.36, 31.6, 31.32, 31.43, 31.58; 347/100

[56] References Cited

U.S. PATENT DOCUMENTS

| | | | |
|---|---|---|---|
| 4,365,998 | 12/1982 | Sugiyama et al. ................... | 106/31.49 |
| 5,393,331 | 2/1995 | Loria et al. ........................... | 106/31.27 |
| 5,518,534 | 5/1996 | Pearlstine et al. ................... | 106/31.05 |
| 5,531,818 | 7/1996 | Lin et al. .............................. | 106/31.28 |
| 5,667,572 | 9/1997 | Taniguchi et al. .................... | 106/31.36 |
| 5,690,772 | 11/1997 | Pawlowski .......................... | 106/31.58 |

*Primary Examiner*—N. Le
*Assistant Examiner*—Thinh Nguyen
*Attorney, Agent, or Firm*—Thomas J. Engellenner; Scott D. Rothenberger; Nutter, McClennen & Fish, LLP

[57] ABSTRACT

Methods and compositions for forming polarizing images on an oriented substrate with specially formulated inks are disclosed. The inks can contain a dichroic dye, water, and a humectant. The dichroic inks are particularly advantageous when printed on specially coated molecularly oriented sheets through the technology of ink jet printing. The ink molecules align themselves parallel to the oriented molecules of the oriented sheet thereby forming a light-polarizing image.

53 Claims, 5 Drawing Sheets

INKING METHODS AND COMPOSITIONS FOR PRODUCTION OF DIGITIZED STEREOSCOPIC POLARIZING IMAGES

REFERENCE TO RELATED APPLICATIONS

The current application is a continuation-in-part of and incorporates by reference the commonly-owned, co-pending U.S. patent application Ser. No. 08/381,131, for PRODUCTION OF STEREOSCOPIC POLARIZING IMAGES BY INK JET PRINTING (Attorney Docket No. RWE-005), filed on Jan. 31, 1995.

BACKGROUND OF THE INVENTION

This invention relates to improved methods and apparatus for the production of digitized stereoscopic polarizing images.

Ordinary (unpolarized) light is made of electromagnetic waves vibrating equally in all directions perpendicular to their direction of travel. Absorption-polarizing sheets polarize these light waves by partially or wholly absorbing the vectorial components vibrating in a specified direction transverse to the direction of travel.

A stereoscopic image based on the polarization of light is generally formed of a pair of polarizing images, each of which presents a light-polarizing design or image that selectively transmits light of a predetermined vector of polarization.

Stereoscopic image pairs, having a left-eye light-polarizing image superimposed on a right-eye light-polarizing image, enable the perception of a three-dimensional image when the image pair is viewed through a pair of polarizing filters, or analyzers, oriented to allow the left-eye polarized image to reach the left eye and the right-eye polarized image to reach the right eye. A polarizing image can be made by a sheet that polarizes light to different percentages, depending upon the density of the image at each point. In particular, the percentage of polarization is directly related to the image's density, nearly all light being polarized in high-density areas and only a small amount of light being polarized in low-density areas.

When forming the stereoscopic polarizing image, the most effective arrangement occurs when the polarization axis of the left-eye image is at right angles to the polarization axis of the right-eye image, and when the two layers are superimposed in such position with respect to each other that the images carried thereby are stereoscopically registered. An observer using viewing spectacles comprising orthogonal polarizing left-eye and right-eye lenses, then has each of his or her eyes receiving only the image intended for it, and the pair of images appears as a single three-dimensional image.

Various techniques exist for producing light-polarizing images on the light polarizing sheets. For example, in Land, U.S. Pat. No. 2,204,604, a light-polarizing sheet may initially be formed by a light polarizing material, such as an optically oriented suspension of minute crystals of herapathite or other polarizing material, in a suitable medium, such as cellulose acetate. A picture may then be reproduced on the light polarizing sheet by altering the polarizing characteristics of the sheet over pre-determined areas of the sheet, forming the negative of the desired image. The areas forming the design may be protected with a coating, such as wax, and the sheet subjected to a treatment that destroys or otherwise alters the polarizing characteristics of the exposed areas.

An alternative method for forming the stereoscopic print, as described in Land, U.S. Pat. No. 2,281,101, is to employ a Vectograph™ sheet material comprising a linear hydrophilic polymer, such as polyvinyl alcohol (hereinafter "PVA"), which has been treated such that its molecules are substantially oriented to be parallel to a specific axis. Orientation of polyvinyl alcohol generally can be accomplished by softening the PVA sheet, as for example by subjecting it to heat, or to the action of a softening agent, until the sheet may be stretched or extended, and then by stretching or extending until suitable orientation of the molecules has been obtained. In the case of polyvinyl alcohol for example, the sheet would generally be extended from two to four or five times its length. Once stretched, the PVA sheet is ready for lamination to a non-depolarizing base.

Further in accordance with Land, U.S. Pat. No. 2,281,101, polarizing images may be formed in PVA by printing thereon with certain dichroic, water-soluble, direct dyes of the azo type, or by staining the sheet with iodine in the presence of an iodide. The color of the dichroic image reproduced in this sheet may be controlled by selecting suitable dyes, stains or the like. The stain or dye is applied to the sheet from a halftone plate or a gelatin relief.

The term dichroism is used herein as meaning the property of differential absorption of the components of polarization of an incident beam of light, depending upon the vibration directions of the components. Dichroic dye or stain as used herein refers to a dye or stain whose molecules possess the property of becoming linearly disposed within the oriented sheet material. For example, when a molecularly-oriented polymeric sheet is dyed with a dichroic dye, the sheet will appear dichroic, i.e., it will absorb differently the vectorial components of polarization of an incident beam of light.

According to another method for forming polarizing images, disclosed in Land, U.S. Pat. No. 2,289,714, polarizing images in full color may be produced. In this process, the use of three subtractive dichroic dyes—a minus Red, a minus Green, and a minus Blue dye forming respectively the Cyan, Magenta, and Yellow images—allows the production of a full color image. To achieve full-color stereoscopic images, the Land '714 patent teaches that six well-registered gelatin relief images, a cyan pair, a magenta pair, and a yellow pair, must first be prepared; one relief for each color component in each of the two directions of polarization. Each of the six gelatin reliefs is then appropriately dyed, and an image from each relief is subsequently transferred to the appropriately oriented PVA layer.

One of the drawbacks of this method for producing full color stereoscopic images, as it is currently practiced, is the difficulty and time involved in transferring an image to the oriented polymer sheets. For example, to produce a full-color image with known methods requires transferring each color component of the image from a gelatin relief to the polymer sheet. Besides being time-consuming and expensive, this technique requires great precision in aligning each of the printed images to produce a clear and precise stereoscopic image. Another drawback with known techniques is the difficulty in masking the image. To alter the final three-color stereoscopic image even slightly, all six gelatin reliefs must be altered.

Masking is a term used to describe various methods for enhancing separation records, or original transparencies, in order to compensate for the unwanted absorptions of the subtractive dyes used in making a full-color stereoscopic image. Conventional photographic negatives and positives are held in register with the original slide or the separations to provide improved highlights, cleaner colors, controlled contrast, improved shadow detail, and ultimately remove unwanted colors. These methods are described in great detail in "The Reproduction Of Colour" by R. W. G. Hunt and "Neblette's Handbook Of Photography and Reprography" edited by John M. Sturge.

There is a need for a more efficient method of producing a stereoscopic image that combines the traditional advantages of the prior art while eliminating some of its disadvantages. Accordingly, an object of the invention is to provide an easier and more efficient method of producing full-color stereoscopic polarizing images having clearer and crisper images.

It is also an object of this invention to provide methods, systems and materials that facilitate ink-jet printing of digitized stereoscopic polarizing images.

It is a further object of the invention to provide ink compositions and inking methods particularly suited for ink-jet printing of stereoscopic images.

Further objects of the invention include providing a coating to be used in producing digitized stereoscopic polarizing images by inkjet printing, and formulating dichroic inks for ink-jet printing.

These and other objects will be apparent from the description that follows.

SUMMARY OF THE INVENTION

Inking methods and compositions are also disclosed herein for creating images on molecularly oriented substrates, especially on stretched and oriented polymeric sheets useful, for example, in construction of polarizing images and the like. The present invention is particularly adapted for use in creating polarizing images with ink jet printing devices. For instance, one aspect of the invention can include an ink dispenser, used in conjunction with an ink jet printing device, for storing an ink composition.

The ink compositions of the present invention are formulated to permit rapid start-up and avoid drying in a printing head, provide smooth transfer during the jet spraying operations, and also exhibit controlled drying on the medium.

In one preferred embodiment, the ink solution includes a desalted dichroic dye, deionized water, and a humectant in appropriate proportions to ensure flowability and controlled drying. The ink composition can further include one or more additives selected from complexing agents, preservatives, detergents, co-solvents, and bactericides.

The invention provides for an ink formed of dichroic dye, water, and a humectant that acts as a moisturizing agent. The humectant enables the ink to flow smoothly through the ink jet printing device. The humectant may also act as an evaporation retardant that regulates the rate at which the ink dries, that controls the ink viscosity, and that raises the boiling point of the inks. Various types of humectants can be used within the ink composition. For example, the humectant can be a metal halide salt or an organic salt. Alternatively, the humectant can be an organic solvent, a ketone, a sulfoxide, a sulfone, an amide, a urea, a substituted urea, an ester, a hydroxyether, an amino alcohol, or a lactam, such as pyrrolidone.

Other aspects of the invention provide for an ink formed of a dichroic dye, water, and a humectant that is a wetting agent that reduces the surface tension of the ink. For instance, the wetting agent can be a surfactant. The surfactant can be ionic, cationic, amphoteric, or nonionic. One particularly effective class of surfactants is polyhydric alcohol. The invention also contemplates the use of an antifoam agent within the ink composition to reduce foaming caused by particular surfactants.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE INVENTION

Figure 1:
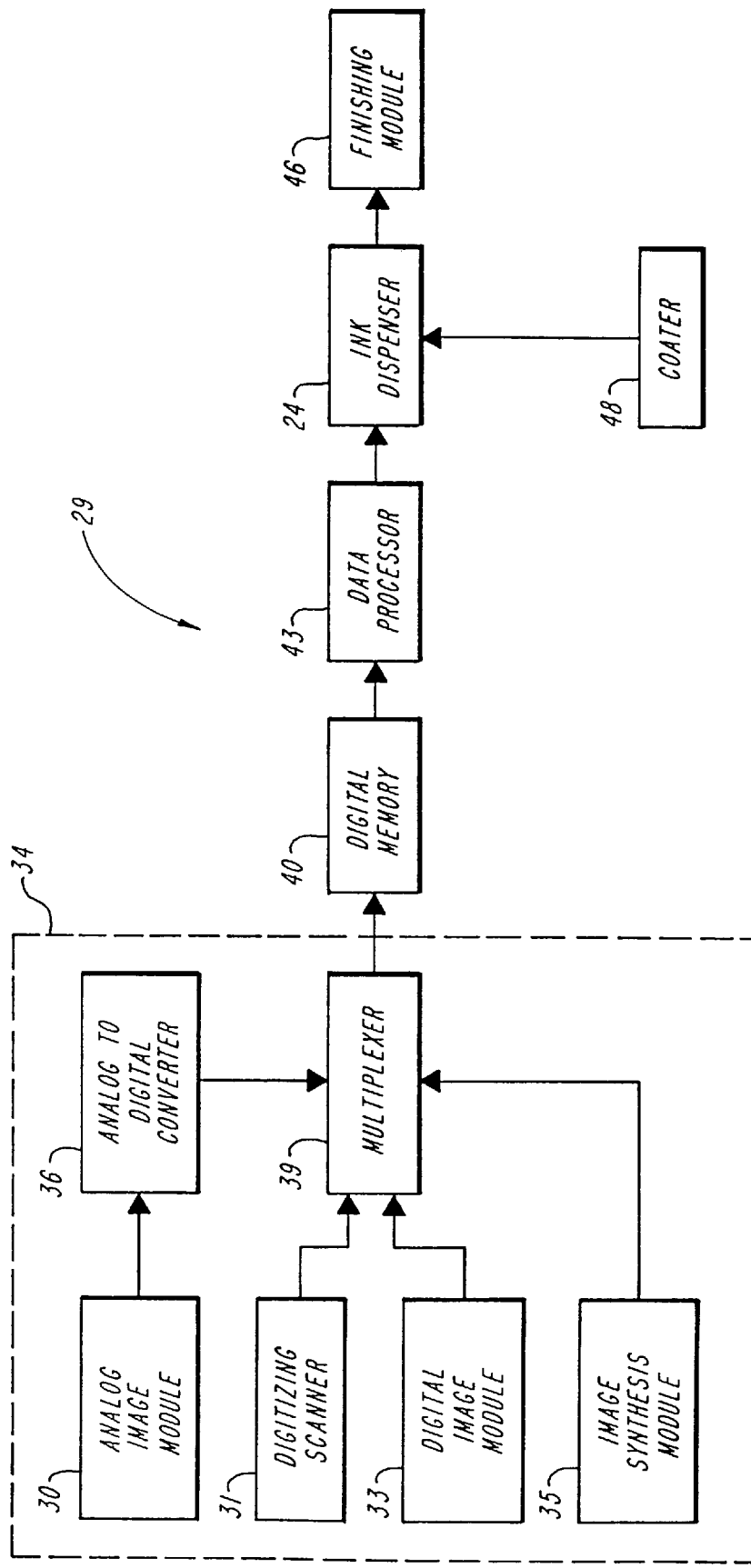
FIG. 1 shows a block diagram of a system for producing digitized stereoscopic polarizing images according to the invention.

Referring to FIGS. 1 through 9, wherein like reference numerals refer to like parts, there are illustrated various forms of polarizing sheets, light-polarizing images, and digitized stereoscopic polarizing images.

FIG. 1 illustrates an imaging system 29 for producing digitized stereoscopic polarizing images, comprising an input stage 34, a digital storage device 40, a data processor 43, an ink-dispenser 24, a coater 48, and a finishing module 46. Input stage 34 can include an analog image module 30, a digitizing scanner 31, a digital image module 33, an image synthesis module 35, an analog-to-digital converter 36, and a multiplexer 39.

Input block 34 is coupled to memory element 40 and supplies memory element 40 with digitized data used for creating a stereoscopic pair. Preferably, input block 34 supplies two digitized data files for each picture in question, one representing the right-eye image and the other representing the left-eye image of a stereoscopic pair. Input stage 34 can accommodate multiple paths for creating digital stereoscopic imaging data, including, but not limited to: an analog image input path; a digitizing scanner input path; a digital image input path; and an image synthesis path.

In the analog image input path of system 34 shown in FIG. 1, an analog image module 30 supplies an electronic analog signal representing a normal flat image for conversion to digital data by module 36. For example, image module 30 can be a standard video camera. Preferably, analog image module 30 supplies two images, one representing a left-eye image and the other representing the right-eye image. Left-eye and right-eye images can be generated through stereoscopic cameras designed for this purpose and known in the prior art.

The input side of analog-to-digital converter 36 is electrically coupled to analog module 30, and the output side of converter 36 is electrically coupled to multiplexer 39. Converter 36 receives a stream of analog data from module 30 and changes the analog data to digital data. Converter 36 outputs to multiplexer 39 digital data representative of the analog data output by module 30.

In the digitizing scanner input path, digitizing scanner 31 generates digital signals representing the flat representations of images, including photographs, slides, and the like. Preferably, digitizing scanner 31 is supplied with two images, one representing a left-eye image and the other representing the right-eye image, for which it generates two separate digital signals. Digitizing scanner 31 can be, for example, a Hewlett Packard ScanJet™ Scanner produced by the Hewlett-Packard Corporation of Palo Alto, Calif. Digitizing scanner 31 outputs, in digital format, a representation of the subject images to multiplexer 39.

In the digital image input path, digital image module 33 supplies a directly digitized image for conversion to a light polarizing image. Digital input module 33 may comprise, for example, a digital camera. In another embodiment, digital image module 33 may include a digital storage device, such as a CD ROM, or floppy disc containing a digital data file corresponding to an image. In addition, a pair of planar images that are right-eye and left-eye views may be produced in an image synthesis module 35 from seismic rotation cameras and CAD or CAM drawing programs.

Multiplexer, or selector, 39 connects either the signal generated by converter 36, digitizing scanner 31, digital image module 33, or image synthesis module 35 to digital memory 40. Alternatively, system 29 can exclude selector 39 and instead couple directly to digital memory 40 either converter 36, scanner 31, or digital image module 33. Digital memory 40 comprises a standard device for storing and retrieving digital signals, such as CD ROM, disc drives, tapes, magnetic memory devices, or random access memory. Digital memory 40 thus stores for later use data representing either a single image or a pair of left-eye and right-eye images for conversion into a stereoscopic pair of polarizing images.

Digital memory 40 is coupled to data processing apparatus 43. Data processing apparatus 43 includes an element for controlling ink-dispenser 24 and an element for processing digital data supplied by memory element 40.

Data processor 43 can include, for example, electronic apparatus capable of manipulating the data obtained from memory element 40 such that the image represented by the data can be flipped horizontally or vertically. The ability to flip the image represented by the data facilitates the stereoscopic registration of left-eye and right-eye images.

Data processor 43 can also include electronic apparatus that allows the data representing an image's pixel density to be manipulated in a manner that allows resizing compression or expansion of the image. Preferably, data processing apparatus 43 also contains structures for touching up the image and for enhancing the clarity or contrast of the image. The image clarity can be enhanced by modifying the brightness, intensity, or hue characteristics of particular pixels in the image. One enhancement technique involves combining the image with its mathematical derivative. The derivative of the image enhances the clarity of edges in the image. In one embodiment, data processor 43 can also be used to modify the content of images, i.e., to produce composite images or collages or to remove unwanted elements. In one embodiment, data processor 43 can be a general purpose computer running Adobe Photoshop™ software produced by the Adobe Corporation of Arizona.

In a preferred embodiment of this invention, digital memory 40 contains data representing both the left-eye and right-eye images of a picture being converted to a digitized stereoscopic image. In an alternative embodiment, digital memory 40 contains a three-dimensional data set describing the three-dimensional geometry of an object or of a scene: a computer graphic model. Image-processing apparatus 43 is used to render left and right members of a stereoscopic pair of images of the object or scene with computer graphic techniques well known in the art. For example, stereoscopic image pairs can be produced from the data generated by image synthesis module 35 by rendering a model once and then rendering again after a small angular rotation around the vertical axis running through the model, or, in the case of a scene, rendering an image and then, after a small displacement in the horizontal position of the viewpoint, making a second rendering. Such computer graphic techniques produce with computer graphic modeling and rendering the equivalent left and right perspectives produced by stereoscopic image capture.

Data processing apparatus 43 generally reduces or increases the pixel density of the digitized images stored in memory element 40 to a pixel density appropriate to the desired percentage of polarization. For example, a digitized image may contain approximately 2000 pixels per inch while a desirable density for the light-polarizing image is around 300 pixels per inch. In one embodiment, data processor 43 can reduce the pixel density by replacing a group of two or more adjacent pixels with a single new pixel representing a weighted average of the characteristics of the replaced group of adjacent pixels. In another embodiment, processor 43 can increase pixel density by adding new pixels to the image between already existing pixels. The characteristics of the newly generated pixels are determined by interpolation between adjacent pixels already in the image.

Data processing apparatus 43 is electronically coupled to ink-dispenser 24. Ink-dispenser 24 can include various ink-jet printers known in the art, and other printers capable of spraying ink. Generally all functions of ink-dispenser 24 are slaved to control signals generated by data processor 43, except for the quantity of ink sprayed for each dot of ink.

Ink-dispenser 24 applies, under the control of processor 43, the left-eye image to a first polarizing layer and the right-eye image to a second polarizing layer. The first and second sheets with left-eye and right-eye images, respectively, become light-polarizing images. When the left-eye and right-eye images are oriented such that their polarizing axes are orthogonal to each other, when stereoscopically registered, they bring each other to full contrast. In one preferred embodiment, ink-dispenser 24 applies left-eye and right-eye images to polarized layers on opposite sides of a single sheet 2, as described more fully by FIG. 5. The sheet described by FIG. 5 can have stretched and oriented PVA laminated to both sides of a non-depolarizing base, with one side oriented at −45° and the other at +45°.

A coater 48 can also be coupled to ink dispenser 24. Coater 48 supplies polarizing sheets having an ink-permeable polymeric coating to printer 24. Alternatively, the coating process can be practiced during manufacturing of the sheets. The ink-permeable polymeric coatings aid in the imbibition of ink by the polarizing sheets, as further described below.

Following printing and imbibition of the inks by a polarizing layer, the sheet can be processed in finishing module 46. Finishing module 46 can comprise, either alone or in combination, a washer for cleaning the image-bearing sheets, a protector for applying protective coatings, and a laminator for affixing one polarizing sheet to another.

Finishing module 46 can contain a washing system when the exterior of the polarizing image contains a removable coating or some active component that needs to be removed prior to storage. One embodiment of the washer comprises wiping the polarizing image with a sponge containing an aqueous solution to remove water-soluble matter, such as a coating as later described in this disclosure. A second embodiment involves immersing the polarizing image in a tray containing an aqueous solution and then rubbing the sheet gently with a sponge to remove any water-soluble matter on the exterior of the sheet. A third embodiment comprises passing the polarizing image between rollers in contact with a strip sheet. After removal of any matter on the exterior of the polarizing image using a washing system, the sheet can be drained and squeegeed or placed on dry toweling and wiped gently dry with soft toweling or tissues. All of these washing systems can easily remove water-soluble matter without damaging the polarized images.

Finishing module 46 can contain a protection system for applying protective layers to the polarizing image. For example, module 46 can apply a hardener, a protective polymeric coating, or a cross-linking agent to the exterior of the polarizing image. This hardener, protective polymer, or cross-linker protects the polarizing image over time from damage resulting from physical contact. Module 46 can also be used to apply a layer for protecting the polarizing image from the detrimental effects of ultraviolet radiation.

Following the optional washing or postcoating system 46 and any subsequent drying, left-eye and right-eye polarizing images are stereoscopically aligned and laminated back to back, if the left and right images were not applied to opposite sides of a single sheet originally. Two polarizing images can be stereoscopically aligned by ensuring that an identical point found in both images becomes the farthest point forward in the foreground of each individual polarizing image, and by superimposing the two polarizing images so that the farthest point forward in each image coincides. The combination of two orthogonally polarized images as disclosed herein, produces a full color stereoscopic polarizing image when viewed through a pair of polarizing filters or glasses. An alternative embodiment is to print on a two sided light-polarizing sheet as described above.

A preferred embodiment of the invention stereoscopically aligns the left-eye and right-eye images with the data processing apparatus 43 operating in conjunction with the memory element 40. After the left-eye and right-eye images are correctly aligned by the data processing apparatus 43, the left-eye and right-eye images can either be printed on two single-sided sheets 2 which are then aligned, or the images can be printed on opposite sides of the double-sided sheet 3 of FIG. 5.

In accordance with this preferred embodiment, data processing apparatus 43 includes a projection element for projecting a coordinate system onto each of the digitally stored left-eye and right-eye images, and a moving element for moving at least one of the left-eye and right-eye images relative to the projected coordinate system. With the projection element and the moving element, the apparatus 43 can stereoscopically align the left-eye and right-eye images.

To stereoscopically align the left-eye and right-eye images, apparatus 43 first projects separate, but interrelated, coordinate systems onto the digital representations of both the left-eye and right-eye images. For instance, the coordinate systems can comprise a grid formed of intersecting horizontal axes and vertical axes (i.e. an X-Y coordinate plane). Accordingly, the position of any object in the left eye image can be assigned a first set of coordinates and the position of that same object in the right eye image can be assigned a second set of coordinates. Moreover, these coordinate systems indicate the position of any object in the image relative to the edges of a printed version of the digitally stored representation of the image.

The projection element of data processing apparatus 43 can further provide a coordinate systems for the left-eye and right-eye images that are functionally related. In particular, the location of any object in the left eye image can be determined relevant to the location of the another object in the right eye image. This interrelationship between coordinate system is preferably, but not necessarily, obtained by using identical coordinate systems for the left-eye and right-eye images. The effect is that the position of an object in the printed version of the left eye image can be determined relevant to the position of an object in the printed version of the right eye image, without having to actually generate hard copies of the images.

The data processing element 43 also includes a moving element for adjusting the positions of the left-eye and right-eye images relative to each other. The moving element thus allows the images to be moved on their respective coordinate systems, such that the images will be stereoscopically aligned when printed. In particular, the position of the images are adjusted so that a first identified object in both the left-eye and right-eye images coincide, relative to the edges of the printed version of the digitally stored images. Preferably, an object located the farthest forward in the images is used as the first identified object for aligning the left-eye and right-eye images. By aligning the object based upon an object in the foreground of the image, other objects in the generated stereoscopic image appear to recede from the stereo window (i.e. the plane of the polarizing images). Most people consider images receding from the stereo window more visually pleasing than images protruding from the stereo window.

In another embodiment, the data processing apparatus 43 can also include a rotational element for rotating the digital representations of the left-eye and right-eye images. The rotational element can aid in stereoscopically aligning the left and right images, and removing noticeable alignment errors. One noticeable alignment errors results when the left-eye and right-eye images are not aligned substantially parallel to a horizon line. If one of the images falters from alignment with the horizon line, the human eye will see a noticeable distortion in the generated stereoscopic image. To overcome this problem, the rotational element allows the user to manually, or the processing apparatus 43 to electronically, rotate either the left or right eye image relative to an arbitrary horizon line. Once the left-eye and right-eye images are both positioned substantially parallel to the horizon line, the noticeable distortion will disappear.

Figure 2:
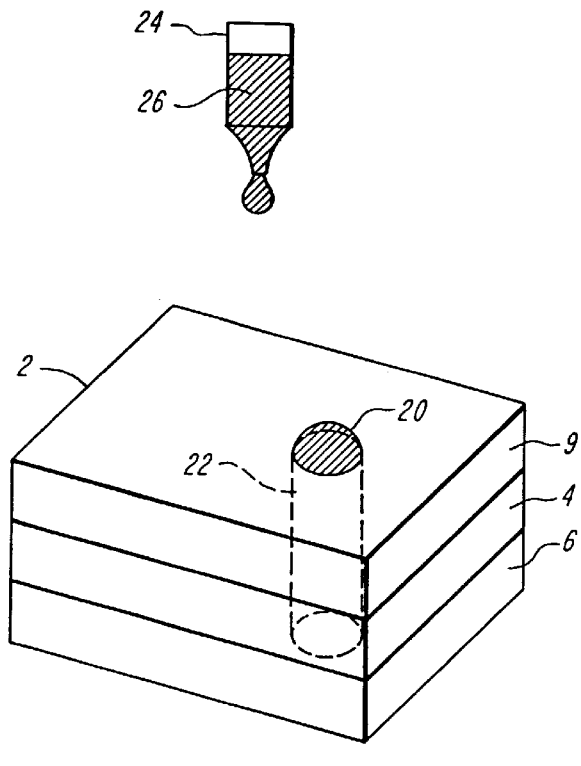
FIG. 2 shows a diagram of a polarizing sheet having a first coating according to the invention.

FIG. 2 illustrates a sheet 2 including a first coating 9 overlying a substrate 4. Substrate 4 can be carried on a backing 6. FIG. 1 also shows an ink dispenser 24 for applying various inks 26 to sheet 2. The inks are applied to the surface of coating 9 in individual dots forming ink pattern 20. Pattern 20 diffuses through coating 9 along an ink diffusion path 22 and is eventually imbibed by substrate 4.

Substrate 4 forms a sheet having a top and a bottom surface. The substrate transmits light and is composed of a substance that appears dichroic when dyed. Generally, substrate 4 can be formed of molecularly-oriented material, such as a stretched and oriented polymer, that allows alignment of dye molecules along parallel lines of substrate molecules. In addition, substrate 4 appears transparent prior to dyeing with ink 26, thus allowing the coloring of the image to be completely controlled by ink dispenser 24.

In one embodiment, substrate 4 is polyvinyl alcohol (hereinafter "PVA"), a long chain polymer that readily assumes a linear configuration upon heating and stretching and also absorbs dichroic stains or dyes. Sheets of PVA can be stretched and oriented according to various methods known in the art. Once stretched and oriented and dyed, the sheet of PVA exhibits properties of dichroism.

Substrate 4 holds a desired image or ink pattern 20 formed when ink 26 is imbibed by the layer comprising oriented molecules forming substrate 4. The pattern formed of printed dots of dye, oriented along parallel lines of polymeric molecules, both transmits the image and polarizes the light passing through substrate 4. The percentage polarization of light by substrate 4 is related to the density of the printed dots of dye forming the desired image.

Base 6 abuts the bottom of substrate 4 and provides flexible support for substrate 4. Base 6 can comprise, for example, a non-depolarizing transparent polymer such as a cellulose acetate butyrate layer approximately 0.005 inches thick or cellulose triacetate layer approximately 0.003 inches thick. Light shined through the combination of substrate 4 and base 6 with the image of ink pattern 20 becomes polarized. These features prove useful when polarizing sheet 2 is used as a transparency or projection sheet.

Alternatively, a stereoscopic polarizing image comprising two laminated images or a single two-sided stereoscopic polarizing image may have a reflective layer mounted to the underside of this sheet containing the stereo image. The reflective layer can comprise, for example, paper coated with metal, a metal mirror, metal foil, or metal flakes suspended in plastic. The reflective layer reflects rays of light entering the top of substrate 4 and passing through base 6. The rays reflected back through base 6 and substrate 4 provide an image of ink pattern 20 to an observer.

Coating 9 overlies the top surface of substrate 4 and can be applied as a viscous fluid with a viscosity ranging from roughly 1000 to 1500 centipoise. The layer of viscous fluid, which dries to a clear film after approximately twenty-five minutes at room temperature, provides a layer substantially 0.2–0.4 micrometers thick. Coating 9 adheres to substrate 4 and ensures the uniformity of any subsequent coatings applied on top of coating 9.

According to this invention, coating 9 comprises a polymeric material. The polymeric material can be a natural or synthetic gum, a natural or synthetic thickener, or a natural or synthetic polymer, such as a cellulosic polymer. Examples of such cellulosic polymers include carboxymethyl cellulose (CMC) and hydroxyethyl cellulose (HEC). For example, the coating 9 can consist of a thin layer of xanthan gum. In an alternative embodiment, coating 9 can comprise a polymeric material in a solution, such as a solution of xanthan gum in deionized water.

Coating 9 is permeable to ink 26, but is not readily dyed or stained by the ink. Coating 9 serves the purpose of holding ink pattern 20 in situ for a period of time during which ink pattern 20 remains wet to the touch, but is held in its place as though it were dry. Over time, the ink migrates downward through coating 9 along ink diffusion path 22, rather than laterally across the top surface of coating 9. This allows the direct transfer of ink pattern 20 to the surface of substrate 4 at a controlled rate with substantially no change in the image formed by ink pattern 20, thereby allowing ink 26 to be imbibed by substrate 4 with substantially no lateral diffusion, smearing, or spreading. Coating 9, therefore, holds ink 26 and regulates the rate and/or facilitates the transfer of ink 26 into substrate 4.

Figure 3:
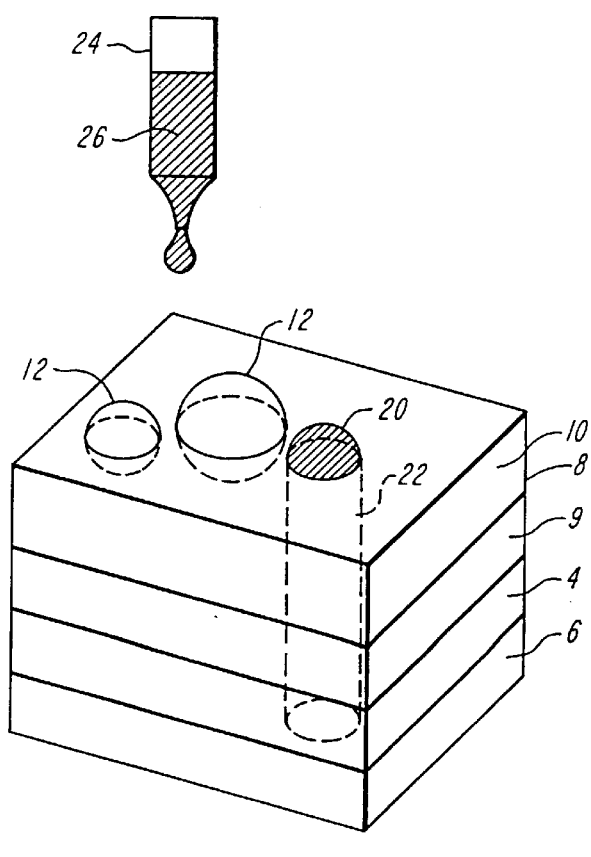
FIG. 3 shows a diagram of a polarizing sheet having a first and a second coating according to the invention.

FIG. 3 illustrates an alternative embodiment of sheet 2 having a second coating 8 extending over first coating 9, that in turn overlies substrate 4. Coating 8 may comprise either a polymeric material 10, or polymeric material 10 in combination with a particulate material 12. In addition, substrate 4 is laminated to backing 6.

Coating 8 overlies coating 9 and is applied after coating 9 has sufficiently dried. Coating 8 is applied as a viscous fluid having, for example, a viscosity ranging from about 5000 to 6000 centipoise. After approximately twenty-five minutes at room temperature, the viscous fluid coagulates and forms a semi-solid layer having a height of approximately 0.1 micrometers.

Coating 8 can be a natural or synthetic gum, a natural or synthetic thickener, a natural or synthetic polymer (e.g. CMC, HEC, or other thickeners), or a combination of natural and synthetic polymeric materials. For example, the polymeric material of coating 8 can include gums, such as xanthan gum. Alternatively, coating 8 can comprise a polymeric material in a solution, such as deionized water.

Both coating 8 and coating 9, either alone or in combination, advantageously hold ink pattern 20 in situ and enable the downward migration of ink 26 along ink diffusion path 22, rather than laterally through the coatings. This allows the direct transfer of ink pattern 20 to the surface of substrate 4 at a controlled rate thereby allowing ink 26 to be imbibed by substrate 4 with substantially no lateral diffusion, smearing, or spreading. Coatings 8 and 9, therefore, hold ink 26 and regulate the rate and/or facilitate the transfer of ink 26 into substrate 4.

In the illustrated embodiment, coating 8 contains a particulate 12, for example HPLC grade silica (manufactured by Waters Corp. under the brand name "Porasil") or colloidal silica, that inhibits lateral diffusion of dye molecules within the polymeric material forming the coating. One such coating according to this invention is formed of xanthan gum and silica. In general, particulates 12 each range from about 0.15 to 0.20 micrometers in diameter.

The ratio of dye permeable, or polymeric material 10, to particulate 12 contained in coating 8 may be varied in order to effect the migration of ink from the top of coating 8 to the bottom of coating 8 and to limit the migration laterally across coating 8. As the ratio of particulate to dye permeable material rises less lateral migration occurs, and as the ratio of particulate to dye permeable material falls more lateral migration occurs. The ratio is modified according to various factors, including: the composition of ink 26, the thickness of coating 9, the thickness of coating 8, and the characteristics of ink dispenser 24 and ink 26. Generally, when particulates are incorporated into the coating, such particulates will range from about 0.35 to about 0.75 percent (by weight) of coating 8.

The particulates 12 can also act as anti-blocking agents between a plurality of sheets 2. The particulates provide a roughened texture to the surfaces of the sheets 2 that weaken the surface tension formed between stacked sheets 2, thereby allowing the stacked sheets to be more easily separated. Without the roughened surface provided by the particulates 12, the strong adherence between stacked sheets can make separation of the sheets difficult.

With reference to FIG. 2 and FIG. 3, coated sheets not printed on within 24 hours can be prevented from drying out, in order that the coatings retain their properties. This may be prevented by wrapping sheet 2 in plastic within an hour after the coatings 8 and 9 have become solidified but retain moisture. Alternatively, sheet 2 can be overcoated with a strippable polymeric film coat to prevent excessive drying. A polymeric film coat applied within 24 hours retains the moisture in the coatings and can be easily removed prior to applying ink 26.

After ink 26 has been applied to sheet 2, it is allowed to dry. The drying time may be quite rapid or take one minute or longer. Various factors will influence the drying time, including the surface tension of ink 26, ink flow resulting from the various characteristics of ink dispenser 24, the thickness of coatings 8 and 9, and the density of ink pattern 20.

The first coating 9 and the second coating 8 may both contain a fungicide to hinder the growth of various microorganisms and mold. The fungicide kills micro-organisms and mold known to feed on polymeric material, thus preventing the same organisms from damaging and potentially destroying coating 8 or coating 9.

In addition, coatings 8 and 9 can form temporary or permanent layers. If temporary, the coatings are generally water soluble to allow easy removal of the coatings. If permanent, the coatings typically are not water soluble or are subsequently overcoated to render the coatings 8 and/or 9 impervious to water damage. Furthermore, the permanent coatings should be transparent and have no significant capability of being dyed as a result of contact with the ink, in order to allow unobstructed viewing of the image or pattern created in substrate 4.

Figure 4:
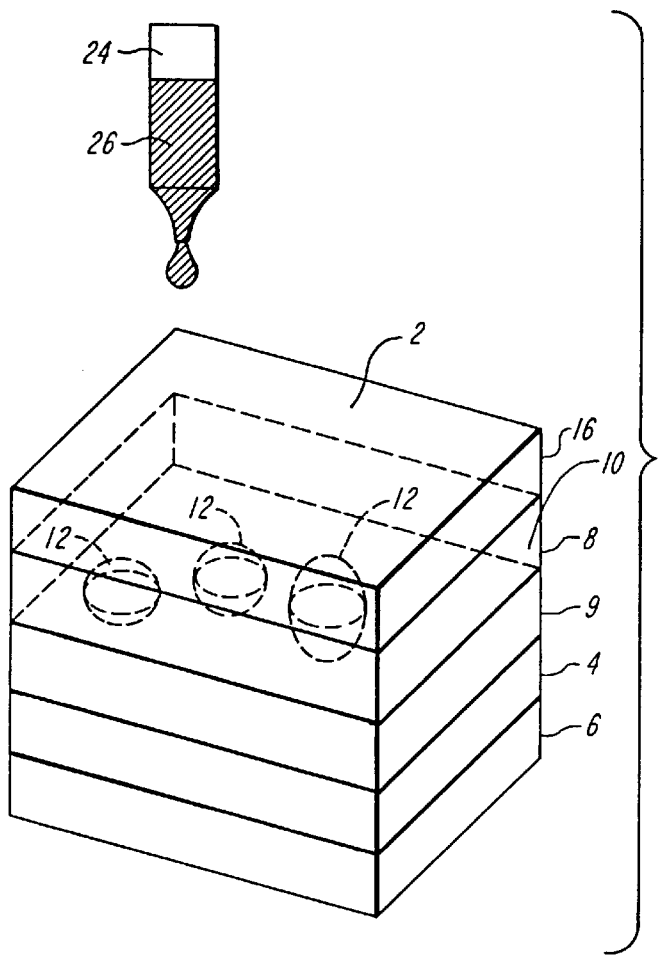
FIG. 4 shows a cross-sectional diagram of a polarizing sheet having a protective layer according to the invention.

FIG. 4 illustrates a sheet 2 according to this invention with permanent coatings 8 and 9 and a protective layer 16 applied after ink 26 has been imbibed by substrate 4 and allowed to dry. Protective layer 16 is formed by treating the top surface of coatings 8 or 9 with a hardener or cross linker designed to alter the polymeric material, thereby rendering coatings 8 or 9 less water-soluble and more durable. In one embodiment, protective layer 16 can be water resistant, and scratch and abrasion resistant, thus preventing marks and indentations that would alter an observer's view of an image in substrate 4. According to another aspect of this invention, protective layer 16 can be designed to absorb ultraviolet radiation in order to retard the fading of the images over time.

Inks 26, in accordance with the invention, can be formulated to permit rapid start-up in a printing head, provide smooth transfer during the spraying involved in ink-jet printing operations, and exhibit controlled drying on substrate 4 and coatings 8 and 9. Inks 26 can comprise a de-salted dichroic dye, and a mixture of de ionized water and polyhydric alcohol in appropriate proportions to ensure controlled flowing and drying. One preferred polyhydric alcohol is diethylene glycol. In formulating ink 26, the water to polyhydric alcohol ratio varies as a function of the type of ink dispenser being used. For example, in the case of the low end ink-jet printers (i.e. those without heaters) the ink composition can contain 75–90% water and correspondingly 10–25% polyhydric alcohol; and in the case of high end ink-jet printers (i.e. those with heaters) the ink compound can contain 80–90% water and correspondingly 20–10% polyhydric alcohol.

Ink 26 can further include a complexing agent, such as ethylenediaminetetraacetic acid (hereinafter "EDTA"), or a preservative. Exemplary preservatives include sodium sorbate, sodium benzoate, parabens, benzalkonium chloride and EDTA. Complexing agents can be added to ink 26 to complex metals. Complexing agents, such as EDTA, can be obtained from Sigma Chemical Company of Saint Louis, Missouri. Alternatively, ink 26 may include both the complexing agent and the preservative. The complexing agent and the preservative combined account for no more than 0.2% (by weight) of the ink compound. Ink 26, in another aspect of the invention, can include a bactericide. Representative bactericides include dehydro acetic acid and Proxel® GXL, obtainable from Zeneca Biocides of Wilmington, Del.

Another feature of the invention provides for an ink 26 having a co-solvent. The co-solvent aids in the start-up phase of printing with the inks 26. For instance, the co-solvent can aid the ink jet printer in overcoming the initial static forces that prevent the flow of the ink composition. The co-solvent can also aids in stabilizing the pH of the ink composition, and the co-solvent can acts as a dye solubilizer. A suitable co-solvent is triethanolamine ("TEA").

The inks 26 used in printing, according to this invention, contain water-soluble, substantially salt-free, direct dyes of the azo type. The dyes chosen possess the property of dichroism, when properly oriented on substrate 4. De-salting the dyes used in the inks are accomplished using standard desalting methods such as dialysis, reverse phase chromatography, high-pressure liquid chromatography, reverse osmosis, and ultrafiltration.

One specific assortment of dyes useful for R,G,B printing is Cyan, Magenta and Yellow (minus Red, minus Green, minus Blue). The Cyan dye comprises Direct Green #27 at 2.0% concentration, the Magenta dye comprises a combination of 30% Direct Red #117 and 70% Sands Violet #9 at a total concentration of 1.0%, and the Yellow dye comprises Primula Yellow from Hodagaya at 2.0% concentration. The particular grouping of dyes currently used for C,M,Y,K printing are Cyan, Magenta, Yellow, and Black. The Cyan, Magenta, and Yellow dyes are formed as disclosed above, and the Black dye comprises Direct Black #170 at 3.0% concentration.

Studies suggest that when the ink 26 is frequently exposed to high temperatures, the ink 26 can decompose. These conditions can occur during the operation of a standard thermal ink jet printer, wherein a resistor element is used to heat inks to temperatures that can exceed 300° F. It is believed that thermal decomposition of the ink under these extreme temperatures results either from the breakdown of the dye or the breakdown of the solution in which the dye is dissolved. In either case, "kogation", i.e. the build-up of deposits resulting from the decomposition of the ink on the resistor element or various ports and orifices in the ink jet printer, can occur. This build-up of residual ink components, or "koga", on the resistor element or in the various ports of an ink jet printer adversely effects the ability of the resistor element to heat the inks and the ability of the printer to apply the inks, thereby decreasing the efficiency of the thermal ink jet printer.

To limit the effects of the kogation, the invention can provide for an ink having a humectant that deters kogation. Accordingly, one aspect of the invention provides for an ink formed of a dichroic dye, water, and a humectant. The dichroic dye can be de-salted, the water can be de-ionized, and the humectant can act as a moisturizing agent. Generally, the drying time of the ink varies according to the ratio of water to the humectant in the ink. For example, one ink composition containing 75–90% water by weight and 25–10% humectant by weight will dry at a different rate than a second ink compound containing 90–95% water by weight and 10–5% humectant by weight.

By acting as a moisturizing agent, the humectant enhances the smooth flow of ink through the ink jet printer. For instance, the humectant can act as an evaporation retardant that reduces or regulates the loss of moisture from the ink through evaporation. The humectant can ensure the stability of the ink's viscosity. The desired viscosity range for the ink varies, although one preferred range of viscosity is about 1.5 to about 2.5 centipoise. The humectant can also raise the boiling point of the ink composition.

Suitable humectants include, for example, metal halide salts (e.g., sodium chloride, potassium chloride, potassium nitrate), organic salts (sodium pyrrolidonecarboxylate), organic solvents such as alcohols (e.g., ethanol, methanol, isopropyl alcohol), ketones (e.g., acetone), sulfoxides (e.g., DMSO), sulfones (e.g., sulfolane), urea, substituted ureas, amides (e.g. dimethylformamide), esters (e.g., ethyl acetate), hydroxyethers (e.g., carbitol, butyl carbitol, cellusolve), amino alcohols (e.g., 1-amino-3-hydroxy propane), and lactams (e.g. N-methylpyrrolidinone, 2-pyrrolidone, cyclohexylpyrrolidone).

The humectant can also be a wetting agent that reduces the surface tension of the ink. Wetting agents (or surface tension reducing agents) lower the surface tension of water below its known value of 72 dynes/cm. For instance, the wetting agent can reduce the surface tension of an aqueous solution containing a dichroic dye to 40 dynes/cm or less. In a preferred embodiment, the surface tension reducing agent lowers the surface tension of the solution to the range of about 2- to 35 dynes/cm. In one embodiment of the invention, the surface tension reducing agent is a surfactant.

The term "surfactant" is recognized in the relevant art to include those compounds which modify the nature of surfaces, e.g. reducing the surface tension of water. Surfactants are generally classified into four types: cationic (e.g. modified onium salts, where part of the molecule is hydrophilic and the other consists of straight or branches long hydrocarbon chains such as hexadecyltrimethyl bromide), anionic, also known as amphiphatic agents (e.g., alkyl or aryl or alkylarylsulfonates, carboxylates, phosphates), non-ionic (e.g., polyethylene oxides, alcohols) and ampholytic or amphoteric (e.g. dodecyl-β-alanine, such that the surfactant contains a zwitterionic group). Particular surfactants may cause the ink solution to foam. Accordingly, another aspect of the invention includes an ink having a defoaming agent.

Cationic surfactants useful as surface tension reducing agents in the present invention include long chain hydrocarbons which contain quaternarized heteroatoms, such as nitrogen.

Anionic surfactants (a.k.a. amphiphatic agents) are characterized by a single lipophilic chain and a polar head group which can include sulfate, sulfonate, phosphate, phosphonate and carboxylate. Exemplary compounds include linear sodium alkyl benzene sulfonate (LAS), linear alkyl sulfates and phosphates, such as sodium lauryl sulfate (SLS) and linear alkyl ethoxy sulfates.

Nonionic surfactants do not dissociate but commonly derive their hydrophilic portion from polyhydroxy or polyalkyloxy structures. Suitable examples of polyhydroxy (polyhydric) compounds include ethylene glycol, butylene glycol,1,3-butylene glycol, propylene glycol, glycerine, 2-methyl-1,3-propane diol, glycerol, mannitol, corn syrup, beta-cyclodextrin, and amylodextrin. Suitable examples of polyalkyloxy compounds include diethylene glycol, dipropylene glycol, polyethylene glycols, polypropylene glycols and glycol derivatives.

In accordance with another aspect of the invention, the humectant selected is formed of a glycol lacking an ether bond. In particular, it is believed that those glycols having ether bonds (such as diethylene glycol, and polyethylene glycol) are less preferable than those glycols lacking an ether bond (such as ethylene glycol, and glycerol) because the ether bonds are understood to increase kogation.

According to a further aspect of the invention, ink 26 can include an additive that aids in the removal of deposited koga. For example, a detergent capable of breaking down the deposits formed when an ink undergoes thermal decomposition can be added to ink 26. Such an additive breaks down the deposits due to thermal decomposition formed on the resistor element or in the channels of the thermal printer, thereby allowing the thermal printer to function at normal operating efficiency. These additives are typically selected from one or more of the following materials: phosphates, phosphate esters, diphosphate, monomethyl phosphate, dimethyl phosphate, arsenate, molybdate, sulfite, and oxalate.

Images formed from ink 26 can be transferred to sheet 2 using gelatin relief images, as disclosed in the prior art. However, more advanced systems for transferring images to sheet 2 and for generating stereoscopic polarizing images can be utilized in accordance with this invention. For instance, an ink-dispenser 24 can be mounted an electronic printer under the control of data processor 43. The electronic printers can have either continuous ink supplies or drop-on-demand ink supplies. A preferred electronic printer is a thermal ink jet printer, such as those produced by the Hewlett-Packard Corporation of Palo Alto Calif.

Figure 5:
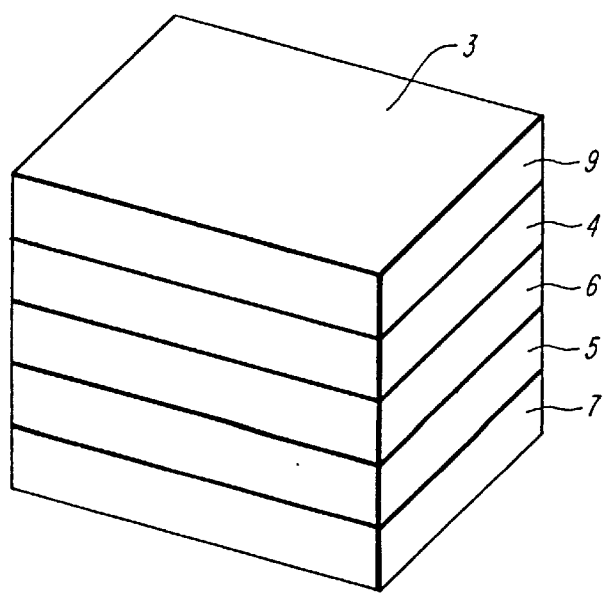
FIG. 5 shows a cross-sectional diagram of a multilayer sheet capable of forming a pair of polarizing images according to the invention.

FIG. 5 shows a preferred stereoscopic polarizing image 3 having a 0.003 inch thick triacetate base 6, a first molecularly-oriented substrate 4 laminated to the top surface of base 6, and a second molecularly-oriented substrate 5 laminated to the bottom surface of base 6. substrates 4 and 5 are oriented such that their respective molecular orientations are at opposing 45 degree angles to the running edge of base sheet 6 and at 90 degrees to each other. Coating 9 (as described herein) is mounted to the top of substrate 4, and a second coating 7 is mounted to the bottom of substrate 5. The combination of substrates 4 and 5, coatings 7 and 9, and base 6 result in a multilayer structure approximately 0.004 inches thick. This combination is thin enough to fit well within the tolerances of standard ink-jet printers.

In accordance with this invention, coating 9 is applied to the top surface of substrate 4 and a second coating 7 is applied to the bottom surface of substrate 5. After the coatings have dried, sheet 3 is then coated with a strippable polymer coat to prevent excessive drying of coatings 7 and 9. At that point, sheet 3 can be slit and cut into units of suitable sizes for printing.

This embodiment simplifies printing of a desired image or pattern to both sides of single sheet 3, thus removing any alignment problems when forming a stereoscopic polarizing image. Accordingly, sheet 3 is inserted into ink-dispenser 24 for application of a first image. After drying, sheet 3 is then flipped and re-inserted into ink-dispenser 24 for application of a second image. This system forms a complete stereoscopic polarizing image having two differently polarized images laminated together without having to manually align and superimpose separately produced polarizing images.

Figure 6:
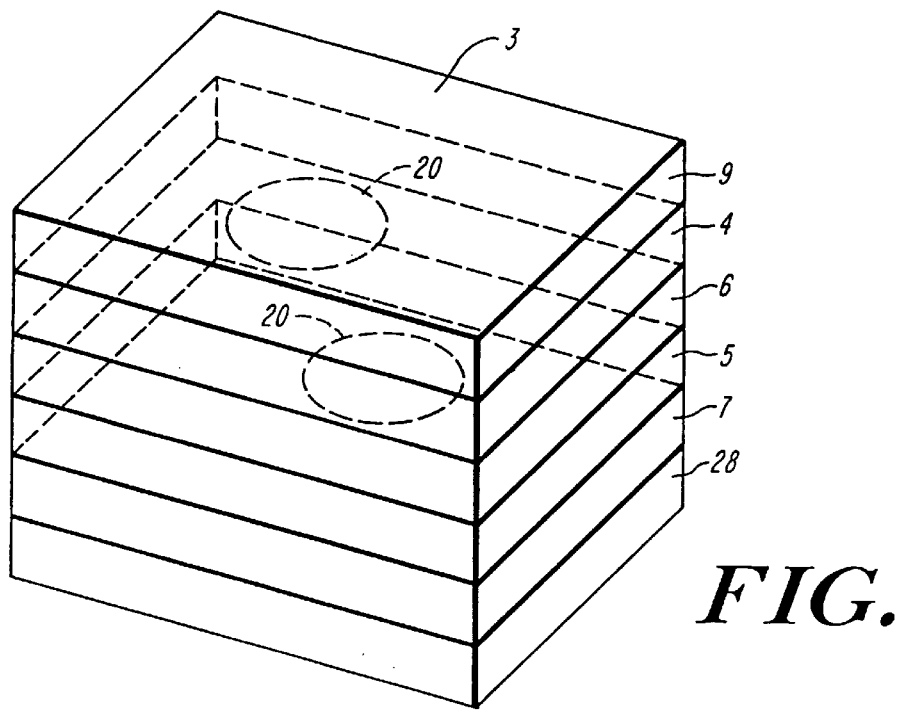
FIG. 6 shows a multilayer sheet having a reflective layer.

FIG. 6 illustrates a stereoscopic polarizing image 3 with a reflective layer 28 mounted to the bottom surface of stereoscopic polarizing image 3. Reflective layer 28 reflects rays of light entering the top of image 3 back through image 3 to provide an image of ink pattern 20 to an observer.

Figure 7:
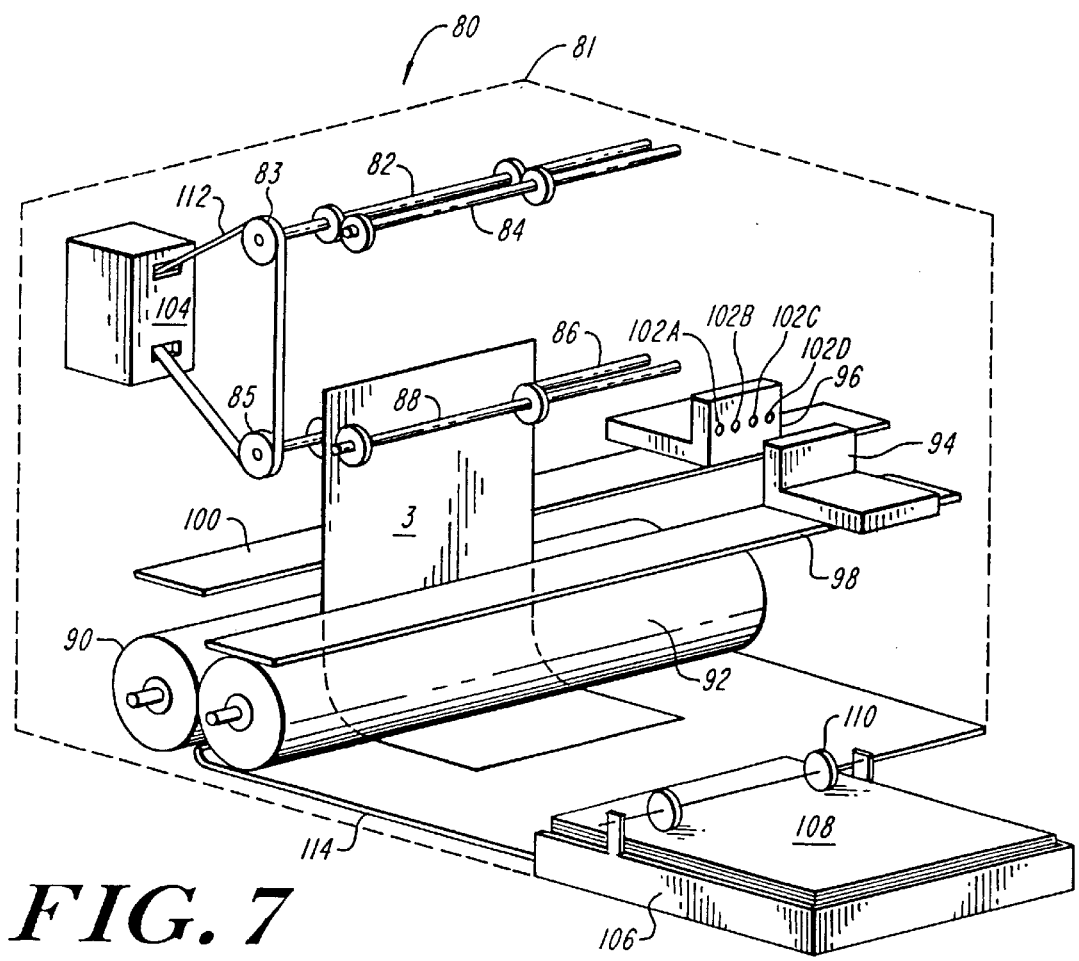
FIG. 7 shows a perspective view of an apparatus used in printing on a double sided medium.

FIG. 7 shows a double-sided printer 80, preferably an ink jet printer, used in applying ink 26 to a double-sided polarizing sheet 3. The printer 80 includes a housing 81 for supporting rollers 82, 84, 86, 88, 90, and 92. The housing 80 also supports track 98 for mounting the first printing head 94 and a second track 100 for mounting the second printing head 96. FIG. 7 further illustrates a printer having a motor 104, a paper cassette 106, and a paper feed 114.

The rollers 90 and 92 maintain tension on the sheet 3 and move the sheet across the printing zone formed between the first and second printing heads 92, 94. Rollers 90 and 92 also maintain tension on sheet 3 and prevent deformation of sheet 3. In addition, motors (not shown) can be connected to rollers 90 and 92 to aid in moving sheet 3 through the printer 80.

Printer 80 also has a pair of substantially parallel tracks 98, 100. The first print head 94 is secured to the first track 98 and the second print head 96 is secured to the second track 100. A motor (not shown) is used to slide the print heads 94, 96 along their respective mounting tracks 98, 100. The print head 94, 96 move along tracks 98, 100 to sweep across the sheet 3.

The print head 96 can include a single ink spray head, or multiple ink spray heads illustrated in FIG. 7 as items 102A, 102B, 102C, and 102D. Print head 94, similar to head 96, can include a single or multiple spray heads. The print heads are positioned on opposite side of the sheet 3 to allow for printing on both sides of sheets 3. Preferably, print head 94 and 96 are moved along tracks 98 and 100 in tandem, such that the printer 80 applies ink to both sides of the sheet simultaneously.

In accordance with a further aspect of the invention, the tracks 98, 100 are oriented substantially horizontally. This allows the print heads 94, 96 to apply ink to a sheet 3 that is substantially vertical. By applying ink to the sheet 3 while it is vertically oriented, the ink is less likely to smear thereby creating an image on sheet 3 having greater precision and clarity.

FIG. 7 also illustrates a cassette 106 holding a stack of sheets 108. The sheets are fed from the cassette 106 with the help of a roller 110. Roller 110 moves a single sheet from the stack 108 onto a paper feed 114. The paper feed 114 directs the movement of the sheet 3 into the space between rollers 90 and 92. Rollers 90 and 92 continue moving sheet 3 through the print space formed between print heads 94 and 96. As the printer heads apply ink to sheet 3, the sheet is moved along by rollers 82, 84, 86, 88, 90, and 92, depending upon the length of the sheet.

The double-sided printer 80, preferably has a paper handling system following rollers 90, 92 that allows the ink applied to both sides of the sheet 3 to dry. For instance, the paper handling system can be structured such that only the edges of the sheet 3 are contacted until the ink applied to sheet 3 dries. Rollers 82, 84, 86, and 88, as illustrated in FIG. 7, contact only the edges of sheet 3 thereby avoiding contact with the areas of sheet 3 covered with ink.

In accordance with a further aspect of the invention, the printer shown in FIG. 7 can also include a controllable motor 104. Motor 104 turns a belt 112 that in turn effects movement of a gear 83 and a gear 85. Gear 83 is mounted to roller 82 and gear 85 is mounted to roller 86. As motor 104 turns belt 112, roller 82 and roller 86 are rotated. Accordingly, motor 104 can be used to extract sheet 3 from the print zone.

In addition, motor 104 can be paused while sheet 3 is being held between the roller pair 82, 84, and the roller pair 86, 88. This allows the ink on sheet 3 to dry without either side of sheet 3, except for the edges, being contacted.

Figure 8:
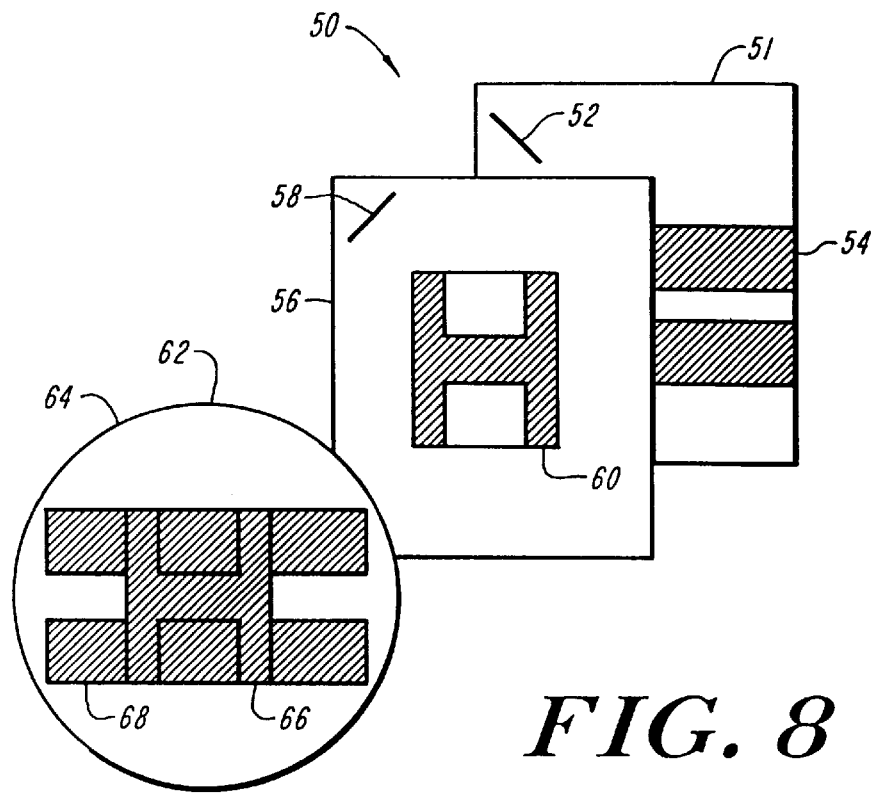
FIG. 8 shows a pair of polarizing sheets and an observable image.
Figure 9:
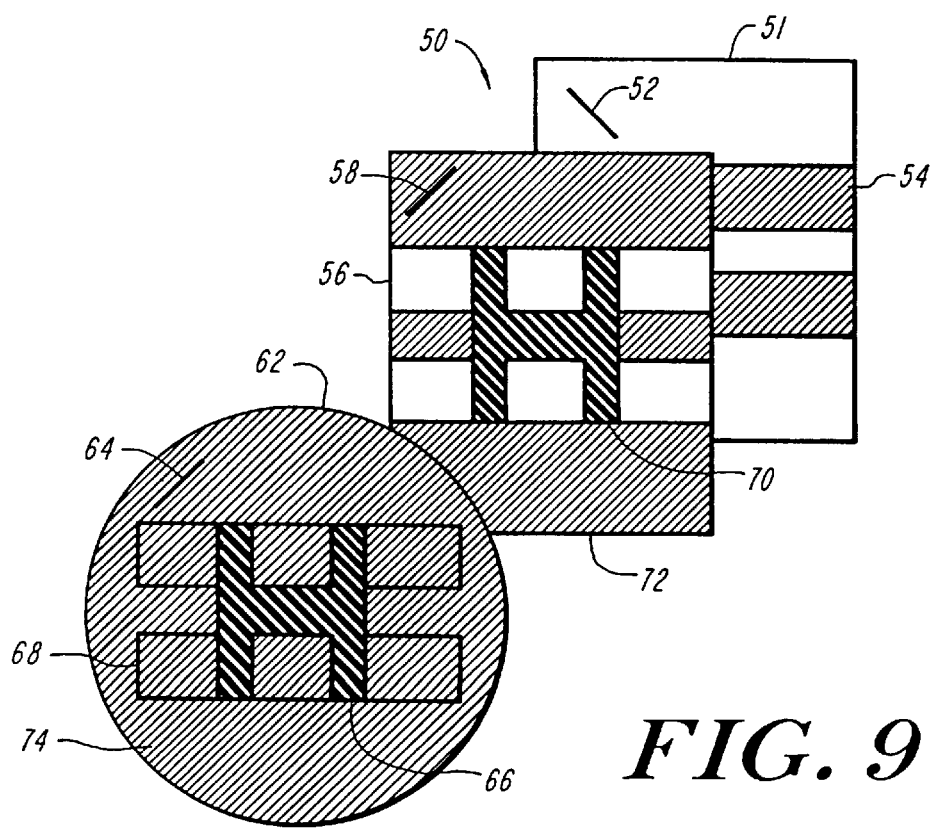
FIG. 9 shows a pair of modified polarizing sheets and an improved observable image.

FIGS. 8 and 9 show further aspects of this invention concerned with the elimination of ghost images which at times can become objectionably apparent to an observer viewing digitized stereoscopic polarizing images and projections thereof. In particular, FIG. 8 illustrates a digitized stereoscopic polarizing image 50 producing a desired image 66 along with a ghost image 68 on a polarizing filter 62, and FIG. 9 illustrates a digitized stereoscopic polarizing image 50 forming the desired image 66 with a reduced ghost image 68 on a polarizing filter 62.

Stereoscopic polarizing image 50 contains a first polarizing sheet 51 and a second polarizing sheet 56. The first polarizing sheet 51 is formed so that it can transmit light polarized along the direction of axis 52, and the second polarizing sheet 56 is formed so that it can transmit light polarized along the direction of axis 58. The degree to which the first and second polarizing sheets transmit polarized light depends upon the density of the image throughout the polarizing sheets. For example, areas of a polarizing sheet having a low pixel density will have a low polarizing efficiency, and areas of a polarizing sheet having a high pixel density will have a high polarizing efficiency.

If an ideal light polarizing sheet of the nature of sheets 51 and 56 were to be observed through an analyzer whose transmission axis is parallel to that of the polarizing axis, the density would be zero. If the analyzer through which this ideal polarizing sheet is viewed were rotated 90°, the density along the axis would be infinite. However, actual polarizing sheets differ from this theoretical ideal.

In actual polarizing sheets, the unwanted light absorption or density in a first image 54 may make that first image observable through the analyzer 64, even though analyzer 64 is intended for viewing only a second image 60. When this degree of imperfection is sufficiently great, ghost images which are observable by either or both eyes of an observer become objectionably apparent.

For example, with reference to FIG. 8, the first polarizing sheet 51 contains a first image 54, shown as two parallel bands, and the second polarizing sheet 56 contains a second image 60, shown as an "H" figure. FIG. 8 additionally illustrates a polarizing filter 62 having a polarizing axis 64 oriented with respect to stereoscopic polarizing image 50, so that only images polarized along axis 58 can be viewed. When the degree of imperfection in sheet 51 is sufficiently great, image 54 can be transmitted through polarizing sheet 56 and be viewed through filter 62. These imperfections cause the viewer to observe a desired image 66 and a ghost image 68 through the filter 62.

In theory, when polarizing sheet 51 is formed of of oriented molecules of polymeric material dichroic ink is deposited with the same orientation, but in practice this does not always occur. When ink is not fully deposited with the same orientation the sheet 51 transmits an image 54 with non-polarized light. The non-polarized light that transmits image 54 is then viewed through analyzer 62 as the ghost image 68.

When an edge of an area of relatively high density which is intended to be blocked from observation is in fact observable along an area of relatively low density of the image which is intended to be observed, the contrast becomes an objectionable ghost image. Under these conditions, it will be appreciated that objectionable ghost images will not be present under all conditions employing digitized stereoscopic polarizing images, and instead will be limited to particular scenes wherein a high density background of one image and a low density of the second image appear in overlapped relation.

As illustrated in FIG. 9, the ghost images may be reduced to a degree which can be tolerated, if not entirely eliminated, by building into either or the pair of light polarizing sheets 51, 56 a negative image of the other light polarizing stereoscopic image of said pair. For example, the second polarizing sheet 56 can contain a second image 70 and an image 72, such that image 72 is representative of a negative of the first image 54. The negative image 72 reduces the appearance of the ghost image 68 when the digitized stereoscopic polarizing image is viewed through polarizer 62.

Accordingly, this invention provides for a method of reducing the ghost image 68 by forming a first ink pattern representative of the image 70 superimposed with a negative image 72. This first ink pattern is applied with an ink-jet printer to the polarizing sheet 56, and the polarizing sheet 56 is then stereoscopically aligned with polarizing sheet 51 to form the digitized stereoscopic polarizing image 50, such that the negative image 72 reduces the ghost image 68 produced by light passing through polarizing sheet 51.

The first ink pattern, representative of image 70 superimposed with negative image 72, can be formed by using a microprocessor or computer employing a image manipulating tool, such as the Adobe Photoshop™ system, produced by the Adobe Corporation of Arizona. For example, a data file representative of image 54 is stored in a memory element so that it can be easily manipulated and recovered at a later time. The digital representation of image 54 is retrieved from memory and inverted, thereby converting the digital representation into a negative image 72. The digital representations of image 70 and the negative image 72 are then merged together (e.g. by multiplying pixel values) to form a data file representative of image 70 superimposed with negative image 72.

In accordance with another aspect of this invention, the pixel density of negative image 72 is controlled so that a background image 74 produced by the negative image 72 is well matched with the ghost image 68 produced by the first image 54. Pixel density of image 72 is preferably regulated so that the intensity of the ghost image 68 viewed through filter 62 is substantially equal to the intensity of the background image 74 viewed through filter 62. This control advantageously allows a complete elimination of the ghost image.

Preferably, the pixel density of the image is modified with the aid of a microprocessor or computer. In particular, a data file representative of the negative image 72 can be stored in a memory element and this data file can be manipulated so that the pixel density of the image is altered.

In accordance with a further aspect of the invention, the undesired condition resulting in the ghost image 68 may be substantially eliminated by increasing the density of the second image 70, i.e. the image intended to be observed through filter 62, in areas where the offensive overlapping becomes apparent. The system for producing the stereoscopic images increases the pixel density of the image 70 so that the image polarizes light to a greater degree and thus overpowers any objectionable overlapping ghost image and stands out in higher contrast relative to the background noise produced by ghost image 68 and background image 74. Additionally, the system can further increase the contrast between the desired image 66 and the background image 74 during the formation of the negative image 72. In particular, the data file representative of the negative image 72 can be manipulated so that the brightness and contrast of the pixels forming the negative image 72 are reduced relative to the desired image 66.

According to a further embodiment of this invention first image 54 and second image 70 are digitized and stored in a first memory element, and then the system manipulates the digitized images. In particular, the system can convert the first image 54 into a negative image 72 and store the data elsewhere within the first memory element. The negative image 72 is then multiplied with the second image 70 to form a first data set representing the combination of the second image with a negative first image. An ink-jet printer, also under control of the system, can apply a first ink pattern representative of the first image 54 to a first oriented polymeric sheet, and can apply a second ink pattern to a second oriented polymeric sheet. The second ink pattern is preferably dictated by the first data set, so that an image equivalent to the superposition of the second image 70 and the negative image 72 is formed on the second polymeric sheet. When stereoscopically aligned and viewed through the filter 62, the first and second polymeric sheets produce an image 66 and a substantially hidden ghost artifact 68.

It is to be understood that the process of superimposing the negative image 72 with the second image 70 on the second polarizing sheet 56 to remove the ghost produced by the first polarizing sheet 51 applies equally to removing any ghost image produced by the second polarizing sheet 56. In particular, a negative of the second image 70 can be superimposed with the first image 54 on the first polarizing sheet 51 to remove a ghost image produced by the second polarizing sheet 56. Preferably, a pair of polarizing sheets 51, 56 contain negative images representative of the image found on the other polarizing sheet of the pair. Accordingly, this reduces ghost images viewed through a pair of polarizing filters aligned to view the digitized stereoscopic polarizing image 50.

In summary, ink-jet printing methods and systems in accordance with this invention greatly simplify the preparation of full-color stereoscopic polarizing images. Ink-jet printers, unlike gelatin-based transfer systems, are compatible with digital imaging and can be used to provide polarizing stereoscopic reflective prints or transparencies from computer-generated or digitally-processed images, as well as from conventional photographic images that have been digitized. Stereoscopic light-polarizing images produced according to the techniques disclosed in this invention may be produced without the knowledge and use of photographic chemistry, as required with prior techniques. Stereoscopic prints produced in this manner have the added advantage of being easily and inexpensively modifiable. By simply altering the picture in the computer or digital imager, the stereoscopic image may be reprinted in its modified form. In addition, because ink-jet printers simultaneously print multiple colors aligned according to the digitized image, the problems in the prior art associated with aligning six gelatin reliefs are overcome. This invention easily and inexpensively produces a hard copy that provides three-dimensional images representing true spatial dimensionality.

While the invention has been shown and described having reference to specific preferred embodiments, those skilled in the art will understand that variations in form and detail may be made without departing from the spirit and scope of the invention.

Having described the invention, what is claimed as new and secured by letters patent is:

1. An ink for use in an ink jet printing device for staining an oriented polymeric substrate to create a polarized image, the ink comprising:
   a water soluble de-salted dichroic dye that, upon imbibition by an oriented polymeric substrate, polarizes an incident beam of light into differential absorption components;
   water; and
   a humectant that acts as a moisturizing agent, whereby the ink has a surface tension of 40 dynes/cm or less, such that the ink flows smoothly through the ink jet printing device, thereby facilitating the use of the ink to produce a polarized image on the oriented polymeric substrate.

2. An ink according to claim 1, wherein the water is de-ionized water.

3. An ink according to claim 1, wherein the drying time of the ink varies according to the ratio of the water to the humectant.

4. An ink according to claim 3, wherein the water comprises about 75% to 90% by weight of the ink and the humectant comprises about 10% to about 25% by weight of the ink.

5. An ink according to claim 3, wherein the water comprises about 80% to 90% by weight of the ink and the humectant comprises about 10% to about 20% by weight of the ink.

6. An ink according to claim 1, wherein the humectant is selected from the group consisting of metal halide salts, and organic salts.

7. An ink according to claim 1, wherein the humectant is selected from the group consisting of organic solvents, ketones, sulfoxides, sulfones, amides, urea, substituted ureas, esters, hydroxyethers, amino alcohols, and lactams.

8. An ink according to claim 7, wherein the lactam is pyrrolidone.

9. An ink according to claim 7, wherein the ketone is acetone.

10. An ink according to claim 7, wherein the sulfoxide is DMSO.

11. An ink according to claim 7, wherein the sulfone is sulfolane.

12. An ink according to claim 7, wherein the amide is dimethylformamide.

13. An ink according to claim 7, wherein the ester is ethyl acetate.

14. An ink according to claim 7, wherein the hydroxyethers are carbitol, butyl carbitol or cellusolve.

15. An ink according to claim 7, wherein the amino alcohol is 1-amino-3-hydroxy propane.

16. An ink according to claim 7, wherein the lactam is N-methylpyrrolidinone, 2-pyrrolidone or cyclohexylpyrrolidone.

17. An ink according to claim 1, wherein the humectant is a wetting agent that reduces the surface tension of the ink.

18. An ink according to claim 17, wherein the wetting agent reduces the surface tension of the ink to the range of about 25 to about 35 dynes/cm.

19. An ink according to claim 17, wherein the wetting agent is a surfactant.

20. An ink according to claim 19, wherein the surfactant is anionic.

21. An ink according to claim 20, wherein the anionic surfactant is an alkyl or aryl or alkylarylsulfonate, carboxylate, or phosphate.

22. An ink according to claim 21, wherein the alkylarylsulfonate is alkyl benzene sulfonate (LAS).

23. An ink according to claim 21, wherein the alkyl sulfonate or alkyl phosphate is a linear alkyl sulfate or a linear alkyl phosphate.

24. An ink according to claim 23, wherein the linear alkyl sulfate is sodium lauryl sulfate (SLS).

25. An ink according to claim 20, wherein the anionic surfactant is a linear alkyl ethoxy sulfate.

26. An ink according to claim 19, wherein the surfactant is cationic.

27. An ink according to claim 26, wherein the cationic surfactant is an onium salt.

28. An ink according to claim 27, wherein the onium salt is hexadecyltrimethyl bromide.

29. An ink according to claim 19, wherein the surfactant is amphoteric.

30. An ink according to claim 19, wherein the surfactant is nonionic.

31. An ink according to claim 30, wherein said nonionic surfactant is a polyhydric alcohol.

32. An ink according to claim 31, wherein the polyhydric alcohol is ethylene glycol, butylene glycol, 1,3-butylene glycol, propylene glycol, glycerine, 2-methyl-1,3-propane diol, glycerol, mannitol, corn syrup, beta-cyclodextrin or amylodextrin.

33. An ink according to claim 30, wherein said nonionic surfactant is a polyalkyloxide.

34. An ink according to claim 33, wherein the polyalkyloxide is diethylene glycol, dipropylene glycol, polyethylene glycols, polypropylene glycols or glycol derivatives.

35. An ink according to claim 19, further comprising an antifoam agent.

36. An ink according to claim 1 wherein the humectant is formed of a glycol lacking an ether bond.

37. An ink according to claim 1 wherein the ink further comprises a complexing agent.

38. An ink according to claim 37 wherein the complexing agent is EDTA.

39. An ink according to claim 23, wherein the complexing agent is no more than 0.2% by weight of the ink.

40. An ink according to claim 1 wherein the ink further comprises a preservative.

41. An ink according to claim 40 wherein the preservative is EDTA.

42. An ink according to claim 40, wherein the preserving agent is sodium sorbate, sodium benzoate, parabens, or benzalkonium chloride.

43. An ink according to claim 37, wherein the preservative is no more than 0.2% by weight of the ink.

44. An ink according to claim 1 wherein the ink has a viscosity ranging from about 1.5 to about 2.5 centipoise.

45. An ink according to claim 1, further including an anti-kogation agent.

46. An ink according to claim 45, wherein the agent is selected from the group consisting of phosphates, phosphate esters, diphosphate, monomethyl phosphate, dimethyl phosphate, arsenate, molybdate, sulfite, and oxalate.

47. An ink according to claim 1, further including a bactericide.

48. An ink according to claim 47, wherein the bactericide is selected from the group consisting of dehydro acetic acid, and Proxel GXL.

49. An ink according to claim 1, further including a co-solvent.

50. An ink according to claim 19, wherein the co-solvent is triethanolamine.

51. An ink according to claim 1, wherein the ink further comprises a preservative and a complexing agent.

52. An ink according to claim 51, wherein the preservative and complexing agent are no more than 0.2% by weight of the ink.

53. An ink according to claim 1, wherein said ink has a viscosity of between about 1.5 to about 2.5 centipoise.

* * * * *